US011162669B1

(12) United States Patent
Donnan

(10) Patent No.: US 11,162,669 B1
(45) Date of Patent: *Nov. 2, 2021

(54) LANTERN

(71) Applicant: Joseph Donnan, Burr Ridge, IL (US)

(72) Inventor: Joseph Donnan, Burr Ridge, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,124

(22) Filed: Jan. 20, 2021

Related U.S. Application Data

(63) Continuation-in-part of application No. 17/025,006, filed on Sep. 18, 2020, now Pat. No. 11,041,612.

(60) Provisional application No. 62/903,177, filed on Sep. 20, 2019.

(51) Int. Cl.
| | |
|---|---|
| *F21V 21/40* | (2006.01) |
| *B61L 5/18* | (2006.01) |
| *F21V 21/096* | (2006.01) |
| *F21V 17/00* | (2006.01) |
| *F21L 4/00* | (2006.01) |

(52) U.S. Cl.
CPC .............. *F21V 21/406* (2013.01); *B61L 5/18* (2013.01); *F21L 4/005* (2013.01); *F21V 17/002* (2013.01); *F21V 21/0965* (2013.01)

(58) Field of Classification Search
CPC ................................ F21V 21/40; F21V 21/406
See application file for complete search history.

(56) References Cited

U.S. PATENT DOCUMENTS

| | | | | |
|---|---|---|---|---|
| 1,539,105 | A * | 5/1925 | Amos | B61L 5/18 362/185 |
| 1,872,305 | A * | 8/1932 | Larson | F21L 2/00 362/186 |
| 4,530,040 | A * | 7/1985 | Petterson | F21V 19/02 362/188 |
| 6,296,369 | B1 * | 10/2001 | Liao | B60Q 7/00 362/186 |
| 7,118,245 | B1 * | 10/2006 | Herrington | F21L 4/00 362/185 |
| 11,041,612 | B1 * | 6/2021 | Donnan | F21V 7/0075 |
| 2015/0062883 | A1 * | 3/2015 | Shen | F21L 4/027 362/183 |
| 2015/0138763 | A1 * | 5/2015 | Bennett | F21L 4/005 362/208 |
| 2018/0266657 | A1 * | 9/2018 | Brandt | F21V 23/005 |

FOREIGN PATENT DOCUMENTS

WO       WO-9428347 A1 * 12/1994   .............. F21L 4/005

* cited by examiner

*Primary Examiner* — Alexander K Garlen
(74) *Attorney, Agent, or Firm* — Doherty, Wallace, Pillsbury + Murphy, P.C.

(57) ABSTRACT

An exemplary lantern comprising a signal member which serves as a safety feature to warn workers operating in a railyard of dangerous or potentially dangerous conditions. An exemplary lantern comprising a breakaway handle mechanism that allows the handle of the lantern to break away from the body of the lantern. An exemplary lantern may comprise a ratcheting mechanism that allows the handle to rotate relative to the body of the lantern, thereby allowing the lantern to be arranged on the ground in a variety of different positions.

12 Claims, 9 Drawing Sheets

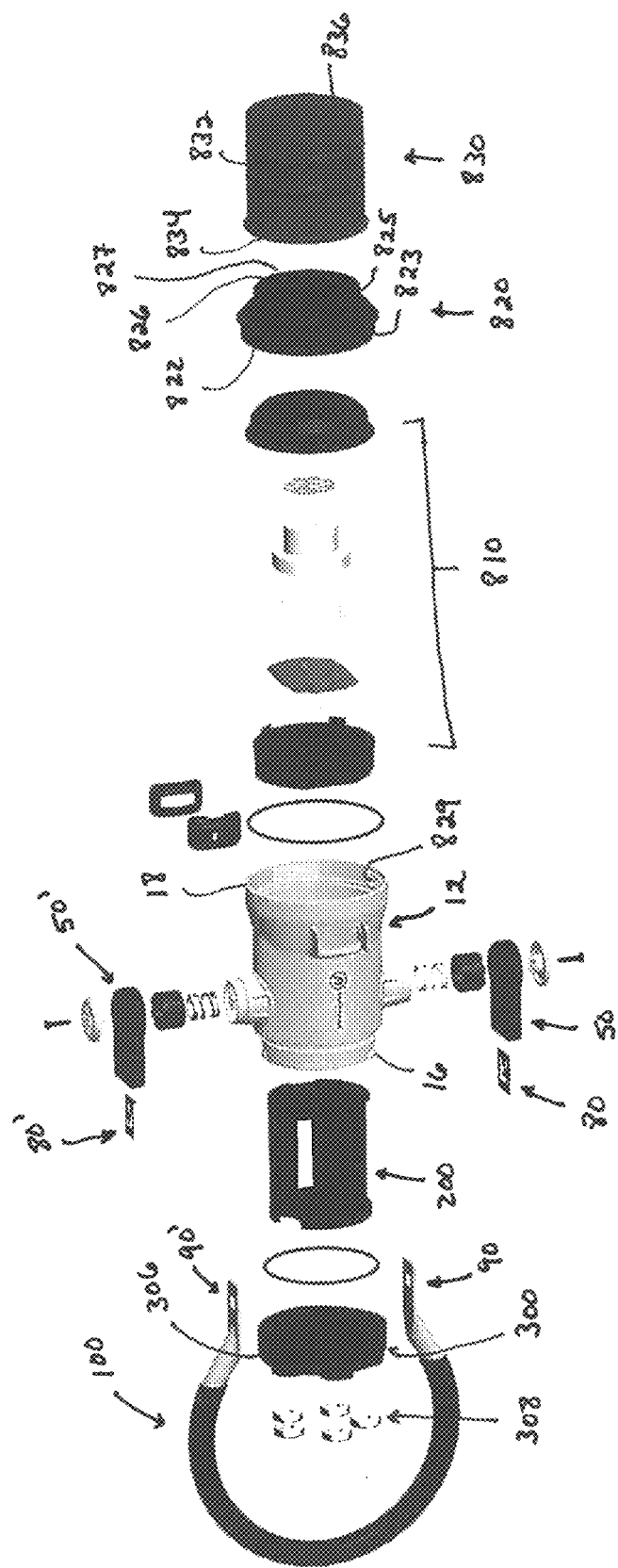

LANTERN

BACKGROUND OF THE INVENTION

1. Field of the Invention

The present disclosure relates generally to a lantern, and more particularly, to a lantern particularly useful in the locomotive industry.

2. Background of the Invention

Trainman's lanterns are specialized lighting apparatus used in the railroad industry for purposes of both signaling and illumination. In particular, trainman's lanterns are used to transmit signals from the brakeman or switchman to the engineer in the locomotive, when coupling/uncoupling cars, moving on to switches and sidings, and so on. Modern lanterns have their origins in the oil lanterns of the 19th century, and so many of the signals now in use (e.g., swinging the lantern through an arc with the arm lowered) were developed on this basis, with the limitation that the lantern needs to be held generally upright.

Furthermore, in addition to signaling, the trainman's lantern must provide general purpose illumination in order for the brakeman to read numbers and information on the cars, to see when walking on the crushed rock ballast, and so on.

There are safety concerns with conventionally known trainman's lanterns. Once such concern arises should the lantern get stuck on a moving train whilst the lantern is suspended from the operator's arm via the lantern's handle and the operator is standing outside of the moving locomotive. Serious injuries have resulted to the operator arising from such a scenario, including limb amputations.

Another limitation with conventionally known trainman's lanterns is the difficulty in positioning the lantern to optimize the positioning of the light emitted from the lantern to thereby enhance the operator's visibility while working on the locomotive.

Another limitation with conventionally known transman's lanterns is the throw distance of the light, i.e., the beam distance of the light. Conventionally known lanterns have a relatively short throw distance, and it is desired to increase the throw distance. Therefore, there exists a need for a trainman's lantern that provides illumination with sufficient brightness that is visible at extended distances. Still further, there exists a need for a lantern that provides such illumination without excessive battery drain.

BRIEF SUMMARY OF THE INVENTION

The above described deficiencies of the prior art are cured or alleviated by an exemplary lantern comprising a breakaway handle mechanism that allows the handle of the lantern to break away from the body of the lantern. An exemplary lantern comprises a ratcheting mechanism that allows the handle to move in a forward and backward motion relative to the body of the lantern, thereby allowing the lantern to be arranged on the ground in a variety of different positions. An exemplary lantern comprises a reflector which is specifically designed to increase the far beam throw of light relative to conventionally known lanterns. In an exemplary embodiment, the lantern comprises a photoluminescent base that lights up in the dark. In an exemplary embodiment, the photoluminescent base assists an operator in finding a lost or dropped lantern. The photoluminescent base also increases the visibility of the immediately surrounding area, thereby minimizing the risk of fall or injury to the operator.

In an exemplary embodiment, the lantern comprises a handle comprising a body having an underside oppositely situated to an upper side, and further wherein the body terminates at a first terminal end thereof and at an oppositely situated second terminal end thereof; a main body housing comprising a side wall comprising a front face oppositely situated to a back face, and a first lateral face oppositely situated to a distal lateral face, wherein the front face, the back face, the first lateral face, and the second lateral face surround a chamber and which terminate to form an anterior directed end of the side wall and which terminate at an opposite end of the side wall to form a posterior directed end of the side wall; a first mount and a second mount, wherein the first mount is attached to and extends from the first lateral face of the main body housing and the second mount is attached to and extends from the second lateral face of the main body housing; and a handle repositioning assembly comprising a means whereby the body of the handle is moved towards and away from the front face and the back face of the main body housing.

In an exemplary embodiment, the lantern comprises a handle comprising a body having an underside oppositely situated to an upper side, and further wherein the body terminates at a first terminal end thereof and at an oppositely situated second terminal end thereof; a main body housing comprising a side wall comprising a front face oppositely situated to a back face, and a first lateral face oppositely situated to a distal lateral face, wherein the front face, the back face, the first lateral face, and the second lateral face surround a chamber and which terminate to form an anterior directed end of the side wall and which terminate at an opposite end of the side wall to form a posterior directed end of the side wall; a first mount and a second mount, wherein the first mount is attached to and extends from the first lateral face of the main body housing and the second mount is attached to and extends from the second lateral face of the main body housing; and a breakaway handle assembly comprising a means whereby the handle may be separated from the body of the main body housing when a threshold force is applied to the underside of the handle.

These and other features and advantages of the present invention will be more fully understood from a reading of the following detailed description with reference to the accompanying drawings.

BRIEF DESCRIPTION OF THE DRAWINGS

FIG. 9 is a schematic depicting an exploded view of the lantern depicted in FIGS. 7 and 8.

DETAILED DESCRIPTION OF THE INVENTION

Figure 1:
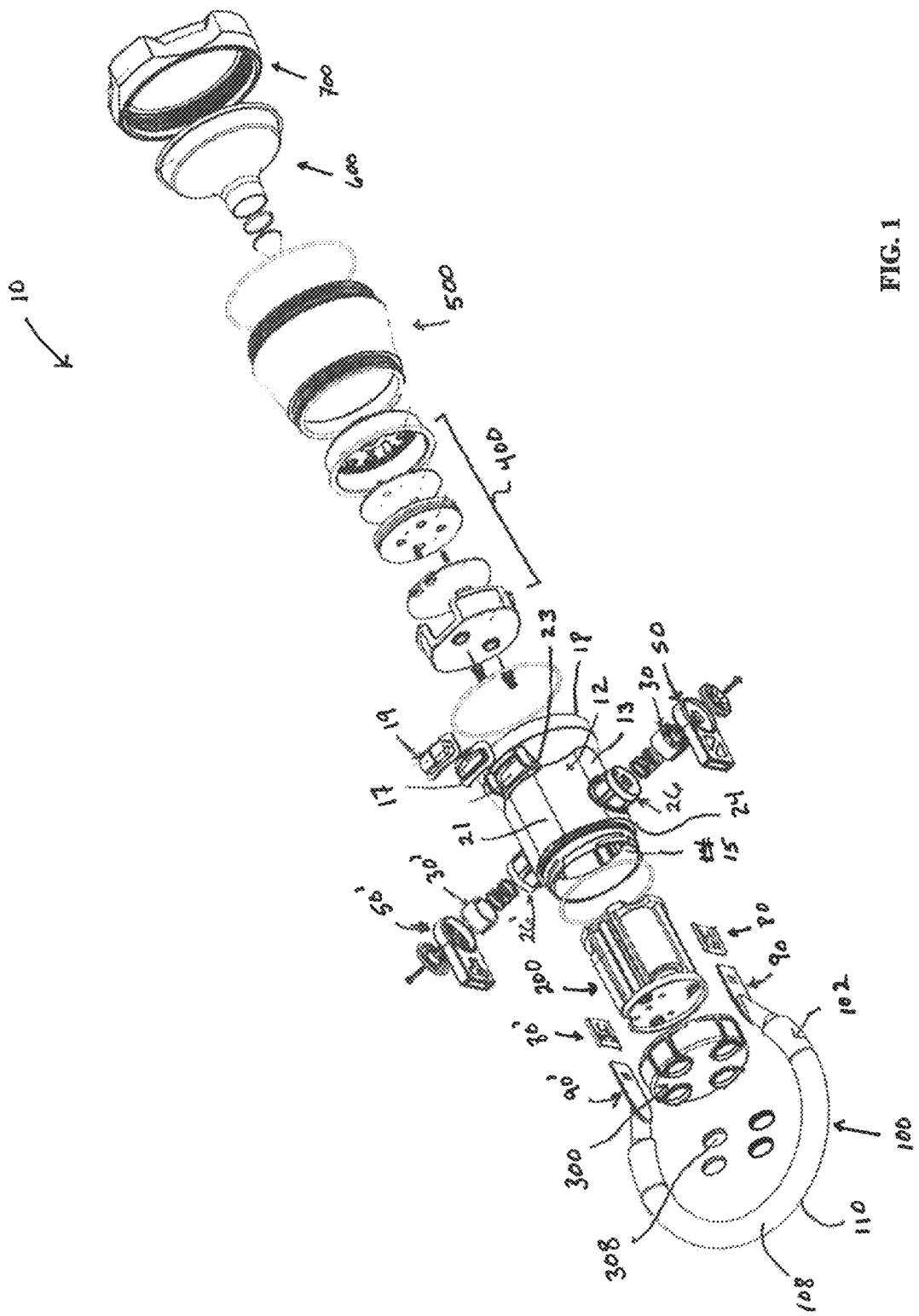
FIG. 1 is a schematic depicting an exploded view of an exemplary lantern.

The presently disclosed lantern comprises a breakaway handle assembly which causes a handle of the lantern to physically detach from a body of the lantern to thereby increase the safety of the lantern's use. This safety feature is particularly important where an operator of the lantern is using the lantern around fast moving objects such as, for example, where the lantern is being used as a trainman's lantern and the operator is using the lantern on or near a locomotive, railcar, moving train-set, and the like.

In an exemplary embodiment, the lantern comprises a ratcheting member which allows the handle of the lantern to be moved and fixed at various positions relative to the body of the lantern. This embodiment allows the position of the handle of the lantern to be varied relative to the position of the body of the lantern. This is particularly useful where an operator wishes to lay the lantern on the ground and point it at a working area. In this way, the handle may be used as a prop, e.g., the handle may be rested on the ground to prop up the body of the lantern.

In an exemplary embodiment, the lantern comprises a battery compartment that holds a C-volt battery, wherein three C-volt batteries is especially preferred. The use of one or more C-volt batteries is an improvement over the conventionally used 6-volt spring terminal batteries as a C-volt battery allows for the use of a smaller and lighter battery housing and it improves the battery life of the lantern. The use of C-volt batteries over 6-volt spring terminal betters also reduces significant battery waste throughout the industry.

In an exemplary embodiment, the lantern comprises a rechargeable battery pack.

In an exemplary embodiment, the lantern comprises a reflector that is specially configured to reflect or focus the light emitted from the light emitting unit of the lantern such that the emitted light has a far beam throw. This improved far beam throw allows an operator of the lantern to see almost twice as many rail cars (car lengths) compared to the visibility allowed using traditionally used lanterns.

In an exemplary embodiment, the lantern comprises an end cap that is positioned towards the handle of the lantern. A top side of the end cap holds a plurality of magnets. The magnets are particularly useful in attaching the lantern to the metal sides of a railcar. The magnets, therefore, increase the number of attachment sites and/or the number of possible positionings of the lantern.

In an exemplary embodiment, the lantern comprises a photoluminescent base that lights up in the dark. In an exemplary embodiment, the photoluminescent base assists an operator in finding a lost or dropped lantern. The photoluminescent base also increases the visibility of the immediately surrounding area, thereby minimizing the risk of fall or injury to the operator.

In an exemplary embodiment, the lantern comprises an integrated signaling light mechanism. In a particularly preferred embodiment, the integrated signaling light mechanism comprises a light emitting diode that emits a warning light, wherein a red warning light is particularly preferred and a flashing red warning light is even more preferred. Although the signaling light mechanism of the lantern has many safety benefits, it is particularly beneficial to an operator during what is referred to as "shoving," i.e., the pushing of railcars from behind by the locomotive. The necessary task of shoving railcars used to be a very noisy procedure. However, with better track, better wheels and bearings, shoving is significantly quieter as compared to the loudness resulting from the shoving of 20 years ago. This decrease in noise has unfortunately increased the risks of personnel getting hit or run over by the locomotive and/or the railcars during the shoving operation. Now with a lantern equipped with a signaling light, when shoving, an operator can activate the signaling light, i.e., cause the emission of, e.g., a red static or flashing light. This activation, then, provides a warning to other rail workers or personnel that the railcars will be or have been set in motion.

In an exemplary embodiment, the lantern comprises an integrated light emitting diode ("LED") signal light. In this embodiment, the lantern comprises a LED switch with built-in safety features that reduces the likelihood that an operator will be stranded in a rail yard without a light. A common problem in rail yards is the risk that the lantern will run out of battery life while the operator is as far as 1-2 miles from the shop. This real-life scenario causes operators to simply change batteries every single shift, regardless of whether the batteries need replacement. To alleviate this problem, the lantern comprises an integrated battery indicator switch mechanism. In an exemplary embodiment, the battery switch indicator comprises a LED that emits a light, wherein a green light is preferred. When the battery(ies) of the lamp are charged to about 100% to about 20%, a LED indicator emits a static light, e.g., a green steady light. When the battery(ies) charge drops below a first threshold level, e.g., below a charge of about 20%, the LED indicator emits a different colored light, wherein a red light is particularly preferred, and a red static light is especially preferred. In an exemplary embodiment, when the battery(s) charge drops below a second threshold level, e.g., below a charge of about 10%, the LED indicator emits another signal, such, as, e.g. a flashing light, wherein a red flashing light is particularly preferred.

Preferred embodiments of the present disclosure will be described hereinbelow with reference to the accompanying drawing. In the following description, well-known functions or constructions are not described in detail to avoid obscuring the invention in unnecessary detail. Throughout this disclosure, like reference numerals represent like elements.

In an exemplary embodiment, the invention includes a breakaway handle assembly that allows the handle of the lantern to readily detach from the body of the lantern so as to avoid personal injury resulting in the situation where the handle fails to readily detach from the body of the lantern, such as in the situation where a user's arm is disposed through the lantern and the lantern is exposed to a sudden potentially dangerous force.

The invention shall be more fully described by reference to the figures, wherein it is understood that the lantern depicted in the figures is exemplary only, and that variations and modifications as would occur to one of ordinary skill in the art from a reading of the present disclosure are included herein.

Figure 2:
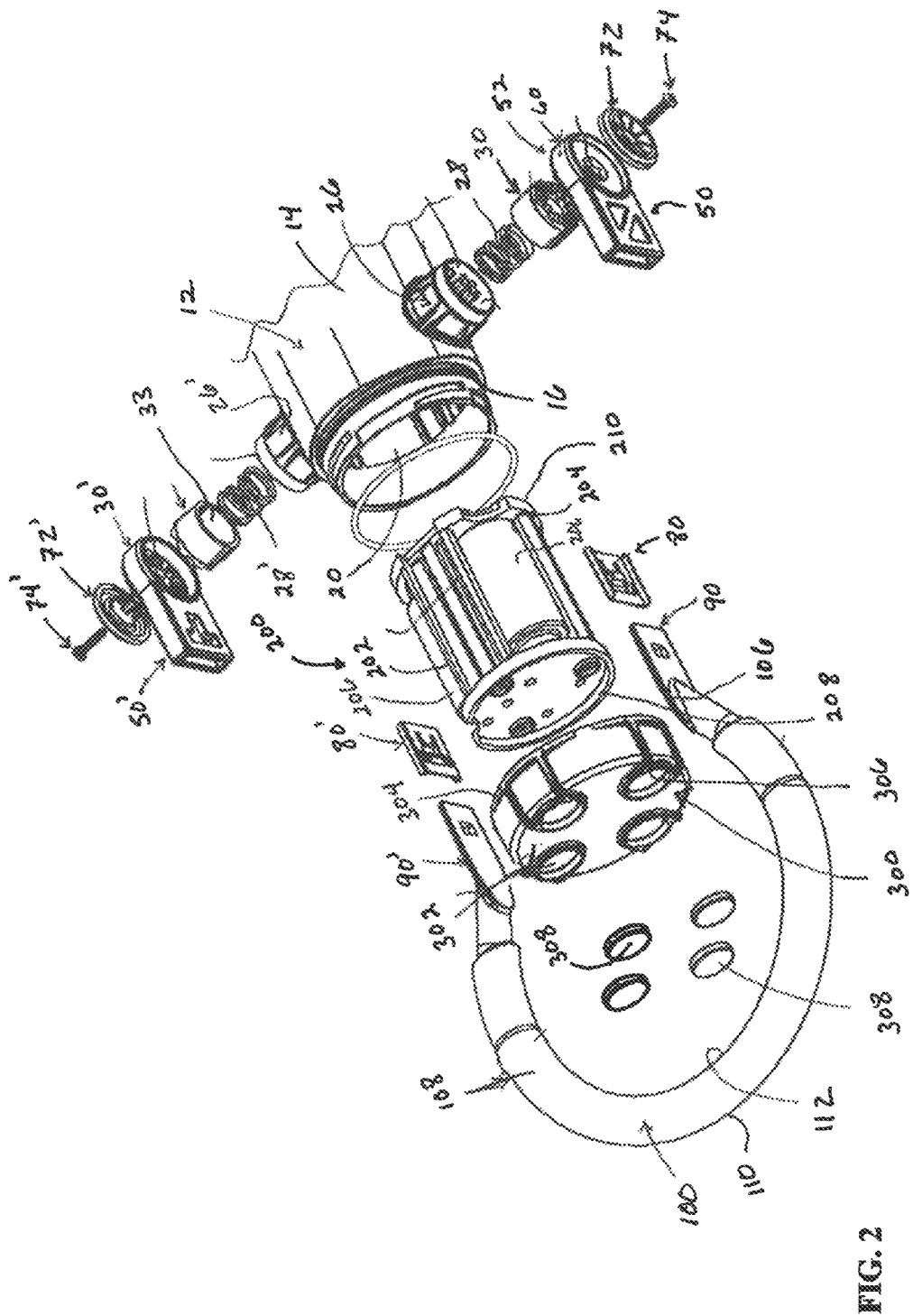
FIG. 2 is a schematic depicting an exemplary breakaway handle assembly, ratcheting feature, and battery compartment of the lantern depicted in FIG. 1.
Figure 3:
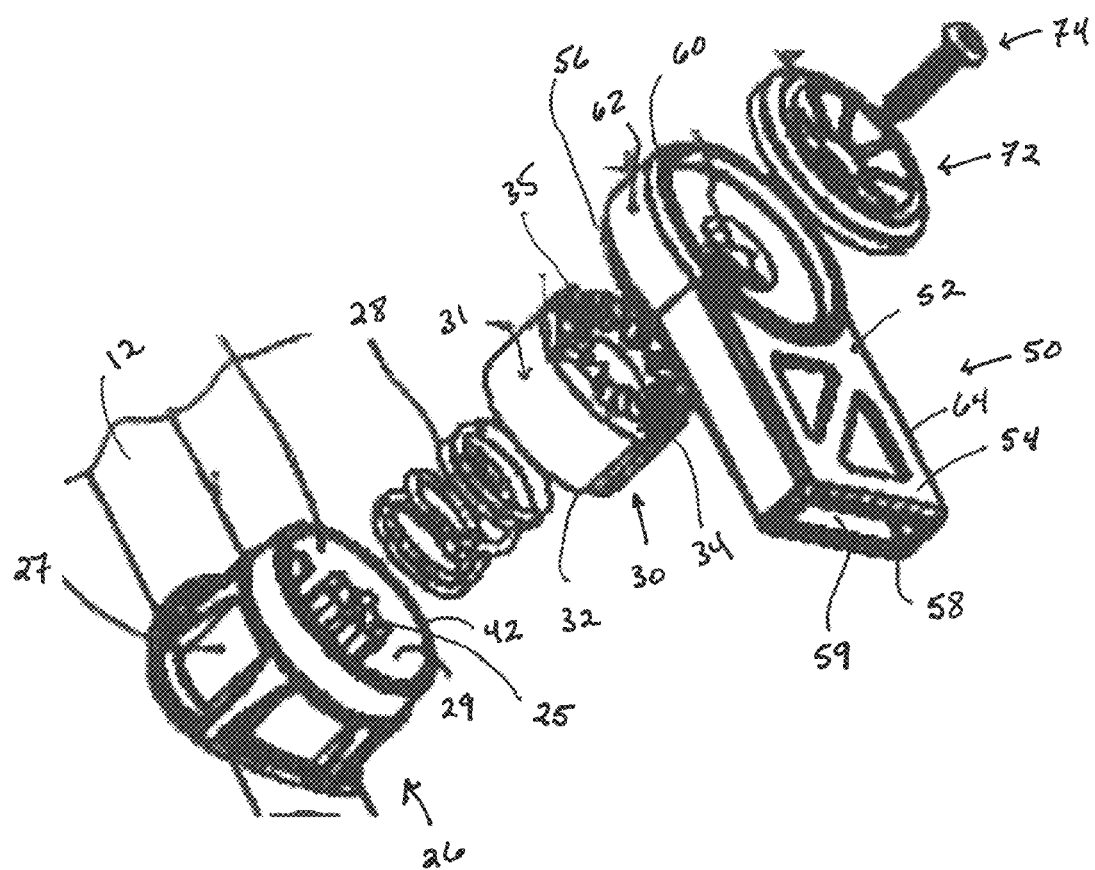
FIG. 3 is a schematic depicting an exemplary handle repositioning assembly.

Referring to FIGS. 1 and 2, an exemplary lantern 10 comprises a main body housing 12 and a handle 100. Main body housing 12 is defined at least in part by a side wall 14 having an exterior side 13 oppositely situated to an interior side 15 and which terminates at a threaded lip portion 16 and at an oppositely situated bottom side 18. Interior side 15 surrounds a chamber 20 which extends from threaded lip portion 16 to bottom side 18. Side wall 14 has a port 23 formed therethrough. An actuating receiver 17 is received by and secured within port 23. An actuating member 19 is received by and secured to actuating receiver 17, wherein actuating member 19 comprises a means, e.g., a switch, whereby a light emitting unit 400 of lantern 10 may be actuated to emit light from lantern 10 and which may also be actuated to turn off the light emitted from lantern 10.

Handle 100 comprises a generally arched-shaped body 102 which terminates at a terminal end 104 and at an oppositely situated terminal end 106.

Lantern 10 is further configured to include an exemplary breakaway handle assembly and an exemplary handle repositioning assembly. Referring to FIGS. 1 and 2, an exemplary breakaway handle assembly comprises a forward directed portion 66 of receiver members 50 and 50', clips 80 and 80', and extensions 90 and 90'; and an exemplary handle repositioning assembly comprises a rearward directed portion 68 of receiver members 50 and 50', positioning members 30 and 30', and mounts 26 and 26'.

Receiver member 50 is identical in configuration and function to receiver member 50', clip 80 is identical in configuration and function to clip 80', extension 90 is identical in configuration and function to extension 90', positioning member 30 is identical in configuration to positioning member 30', and mount 26 is identical in configuration to mount 26'. Accordingly, for ease of clarity, a disclosure of receiver member 50, clip 80, extension 90, positioning member 30, and mount 26 shall be made herein, wherein it is to be understood that such disclosure, unless specifically stated herein, shall refer equally to respective receiver member 50', clip 80', extension 90', positioning member 30', and mount 26'.

Figure 4:
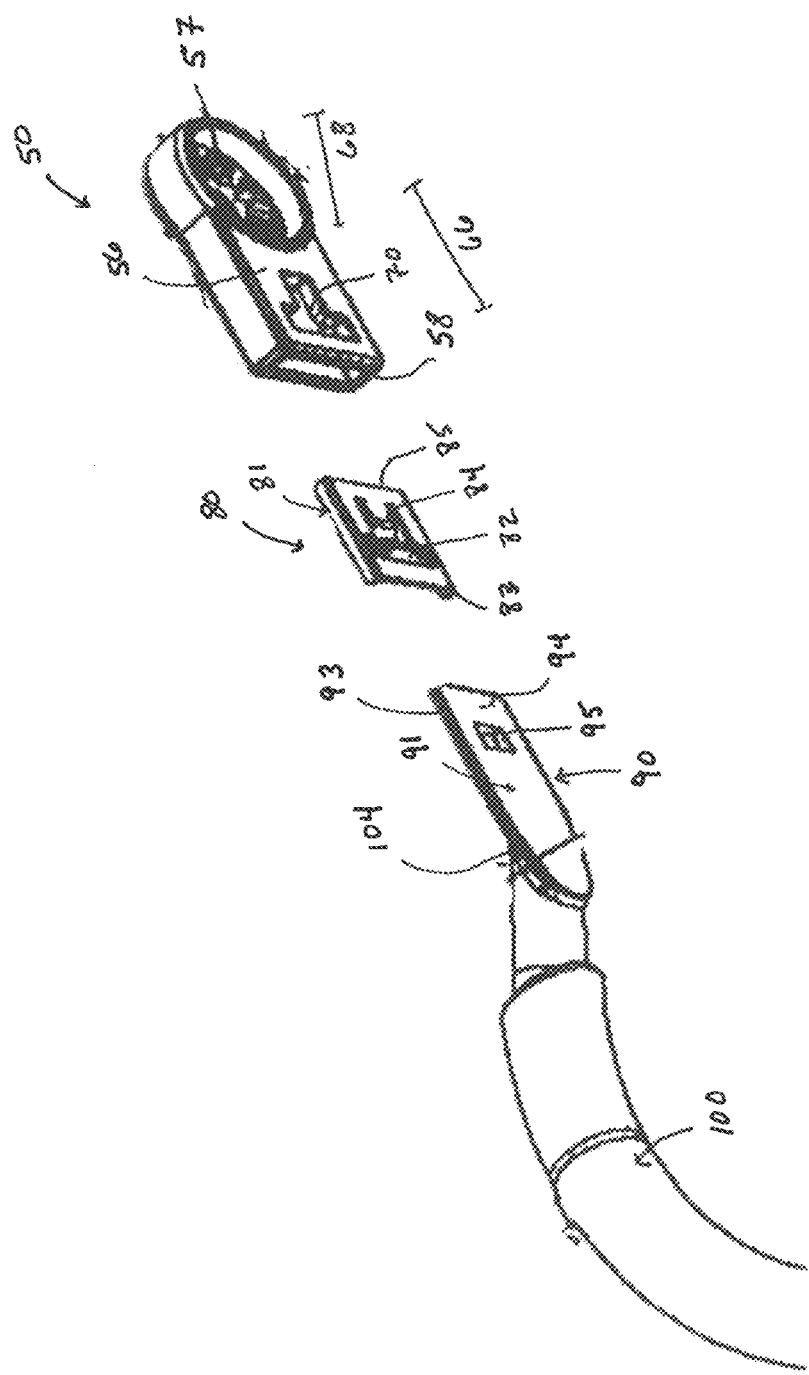
FIG. 4 is a schematic depicting an exemplary breakaway handle assembly.

Referring to FIGS. 1, 2, and 4, in an exemplary embodiment, extension 90 comprises a plate 91 which comprises a front surface 93 oppositely situated to a back surface 94. Front surface 93 of extension 90 is attached to, and preferably integrally formed with, terminal end 104 of handle 100, and front surface 93 of extension 90' is attached to, and preferably integrally formed with, terminal end 106 of handle 100.

Extension 90 further has a clip receiver member integrally formed on plate 91. In an exemplary embodiment, clip receiver member comprises a notch 95 formed through top and bottoms surfaces 93 and 94.

In an exemplary embodiment, clip 80 comprises a plate 81 having a forward directed end 83 oppositely situated to a rearward directed end 85. A detent 82 is formed on forward directed end 83 and a tab 84 is formed on rearward directed end 85. Detent 82 of clip 80 is configured to engage with notch 95 of extension 90 to thereby attach clip 80 to extension 90, and detent 82 of clip 80' is configured to engage with notch 95' of extension 90' to thereby attach clip 80' to extension 90'.

Receiver member 50 comprises a body 52 having an outwardly directed face 54 oppositely situated to an inwardly directed face 56, wherein outwardly directed face 54 is joined to inwardly directed face 56 by an open-ended upper wall 58, a lower wall 60, a proximal side wall 62, and a distal side wall 64, wherein upper wall 58 is oppositely situated to lower wall 60, and proximal side wall 62 is oppositely situated to distal side wall 64. Open-ended upper wall 58 leads into a chamber 59.

Body 52 of receiver member 50 is divided into a forward directed portion 66 and an oppositely situated rearward directed portion 68, wherein open-ended upper wall 58 forms an outermost boundary of forward directed portion 66 and lower wall 60 forms an outermost boundary of rearward directed portion 68.

Forward directed portion 66 has an opening 70 formed through inwardly directed face 56 and which leads into chamber 59. Opening 70 of receiver member 50 is configured to receive and to hold tab 84 of clip 80 to thereby attach extension 90, and thereby handle 100, to receiver member 50, and, thereby, to body 12 of lantern 10. Opening 70 of receiver member 50' is configured to receive and to hold tab 84 of clip 80' to thereby attach extension 90', and thereby handle 100, to receiver member 50', and, thereby to body 12 of lantern 10.

A catch member is formed in a recessed portion of inwardly directed face 56, wherein an exemplary catch member comprises a series of radially disposed grooves 57 formed in a recessed portion of inwardly directed face 56 of rearward directed portion 68 of receiver member 50.

Positioning member 30 comprises a body 31 having an open-ended interior directed side 32 which leads into a cavity 33. Body 31 further has an exterior directed side 34 which is oppositely situated to interior directed side 32. Body 31 further comprises a stop member, wherein an exemplary stop member comprises a series of radially arranged bumpers 35 which is formed on exterior directed side 34.

Mount 26 comprises a body 27 which is disposed on, and preferably integrally formed with, body 12 of lantern 10, wherein body 27 of mount 26 is oppositely situated from body 27 of mount 26'. Each of bodies 27 of respective mounts 26 and 26' has an open-ended exterior directed face 42 which surrounds an opening 29. A protrusion 25 extends within opening 29.

The handle repositioning assembly of lantern 10 further comprises a spring 28 and a spring 28'. Spring 28 is disposed over and around protrusion 25 of mount 26 and spring 28' is disposed over and around protrusion 25 of mount 26'.

Body 31 of positioning member 30 is disposed over and around protrusion 25 of mount 26 and spring 28 such that spring 28 is positioned within cavity 33 of body 31 of positioning member 30. Bumpers of series 35 of positioning member 30 are physically engaged with grooves of series 57 of receiver member 50. Body 31 of positioning member 30' is disposed over and around protrusion 25 of mount 26' and spring 28' such that spring 28' is positioned within cavity 33 of body 31 of positioning member 30'. Bumpers of series 35 of positioning member 30' are physically engaged with grooves of series 57 of receiver member 50'.

Lantern 10 further comprises a cover 72, a cover 72', a pin 74, and a pin 74'. Cover 72 is disposed over and on outwardly directed face 54 of receiver member 50 and is secured thereto via pin 74. Cover 72' is disposed over and on outwardly directed face 54 of receiver member 50' and is secured thereto via pin 74'.

Handle repositioning assembly allows for the movement of handle 100 in a forward or a rearward direction, i.e., in a direction towards a front face 21 of side wall 14 of main body housing 12 or towards a back face 24 of side wall 14 of main body housing 12. For example, when handle 100 is attached and positioned in an upright manner to main body housing 12 of lantern 10, detents 82 of respective clips 80 and 80' are respectively engaged with respective notches 95 and 95' of extensions 90 and 90', and tabs 84 of respective clips 80 and 80' are respectively received by and engaged within openings 70 of respective receiver members 50 and 50' via open-ended upper walls 58 of respective receiver members 50 and 50'. Additionally, series of grooves 57 of receiver member 50 are engaged with series of bumpers 35 of positioning member 30 and held relationally thereto via spring 28, while series of grooves 57 of receiver member 50' are engaged with series of bumpers 35 of positioning member 30' and held relationally thereto via spring 28' which is secured to main body housing 12 via mount 26.

When a certain minimum force is asserted against a forward leading side 108 of body 102 of handle 100, receiver members 50 and 50' rotate, thereby causing springs 28 and 28' to compress and thereby allowing for series of grooves 57 of receiver members 50 and 50' to move across series of bumpers 35 of respective positioning members 30 and 30' and thereby causing handle 100 to move towards front face 21 of main body housing 12. Once the movement of handle 100 ceases, springs 28 and 28' contract thereby locking series of bumpers 35 of respective positioning members 30 and 30' within series of grooves 57 of respective receiver members 50 and 50' and thereby locking body 102 of handle 100 in position. When a certain minimum force is asserted against a rearward leading side 110 of body 102 of handle 100, the opposite direction of motions occurs, i.e., body 102 of handle 100 moves towards back face 24 of main body housing 12, but by the same general mechanisms as set forth above.

The breakaway handle assembly causes handle 100 to separate from main body housing 12 should a threshold amount of force be exerted against an underside 112 of handle 100 as such a force causes detent 82 of clip 80 to disengage from notch 95 of extension 90, detent 82 of clip 80' to disengage from notch 95 of extension 90', tab 84 of clip 80 to disengage from opening 70 of receiver member 50, and tab 84 of clip 80' to disengage from opening 70 of receiver member 50'. This handle breakaway feature is particularly advantageous in that it frees an operator from the lantern in the event where holding onto the lantern could be potentially dangerous to the operator, such as where, e.g., the lantern gets caught on a moving locomotive whilst the operator is holding the lantern by the handle.

Referring to FIGS. 1 and 2, lantern 10 further comprises a battery housing 200 having a generally cylindrical-shaped side wall 202, which, in an exemplary embodiment, has a plurality of cartridges 204 formed therein. Each cartridge of plurality of cartridges 204 holds a battery 206, wherein an exemplary battery is a C-Volt battery. Side wall 202 terminates at one end thereof at a top side 208 and at an oppositely situated end thereof at a bottom side 210. When lantern 10 is assembled, battery housing 200 is positioned within chamber 20 of main body housing 12 of lantern 10 such that top side 208 is directed towards handle 100 and bottom side 210 is directed towards bottom side 18 of main body housing 12.

Referring to FIGS. 1 and 2, in an exemplary embodiment, lantern 10 further comprises an end cap 300 having a top side 302 oppositely situated to a bottom side 304. Bottom side 304 of end cap 300 engages with threaded lip portion 16 of main body housing 12 to thereby contain battery housing 200 between main body housing 12 and end cap 300. Top side 302 of end cap 300 has a plurality of indents 306 formed thereon. Magnets 308 are positioned within and secured to each of the indents of plurality 306.

Figure 5:
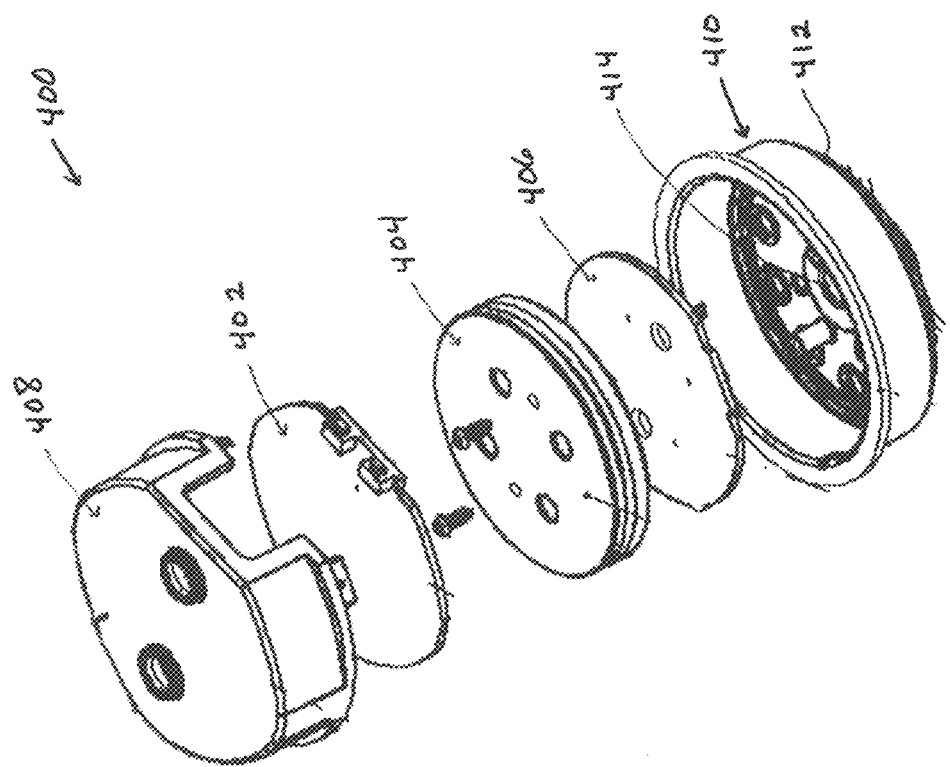
FIG. 5 is a schematic depicting an exemplary light emitting unit as depicted in FIG. 1.

Referring to FIGS. 1 and 5, in an exemplary embodiment, a light emitting unit 400 of lantern 10 comprises a heat sink 404 disposed between a printed circuit board assembly ("PCBA") 402 and a metal core printed circuit board ("MCPCB") and light emitting diode ("LED") assembly 406, wherein PCBA 402 and assembly 406 are in electrical communication with one another and with batteries 206 and with actuating member 19. Unit 400 further comprises an upper cover 408 and a lower cover 410, wherein PCBA 402 and 406 are disposed between and contained within upper cover 408 and lower cover 410.

Figure 6:
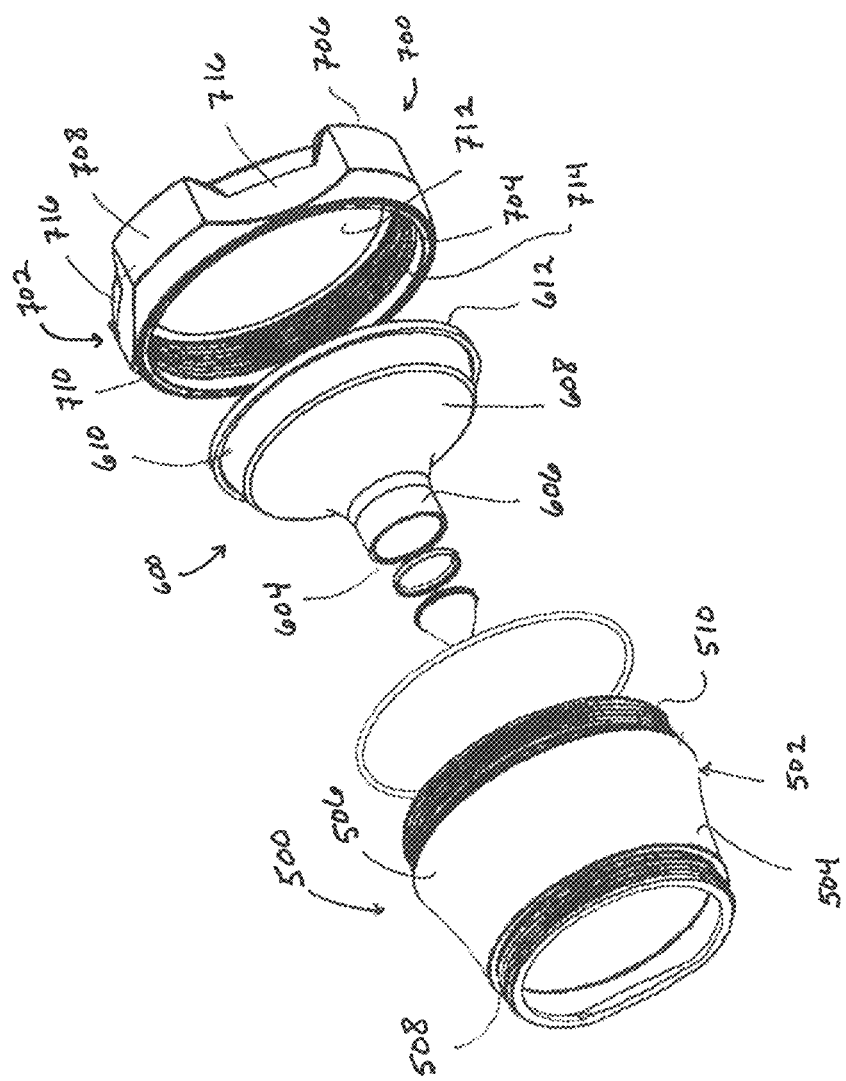
FIG. 6 is a schematic depicting an exemplary shade member, reflector, and base as depicted in FIG. 1.

Referring to FIGS. 1 and 6, in an exemplary embodiment, lantern 10 further comprises a shade member 500. Shade member 500 comprises a generally cylindrical shaped body 502 which has an open-ended anterior terminal end oppositely situated to an open-ended posterior terminal end. Body 502 has an upper region 504 oppositely situated to and contiguously formed with a lower region 506, wherein upper region 504 is recessed relative to lower region 506. In an especially preferred embodiment, upper and lower regions 504 and 506 are translucent.

Shade member 500 further comprises a threaded lip 508 that is contiguously formed with upper region 504 and a threaded foot 510 that is contiguously formed with lower region 506. Light emitting unit 400 is disposed within main body housing 12 such that upper cover 408 is directed towards handle 100 and lower cover 410 is directed towards threaded foot 510. Shade member 500 is secured to main body housing 12 by engaging threaded lip 508 with a complementary receiver member (not shown) formed on interior side 15 of main body housing 12.

Referring to FIGS. 1 and 6, in an exemplary embodiment, lantern 10 further comprises a reflector 600. Reflector 600 has an open-ended top side 604. Open ended top side 604 leads into a generally cylindrical-shaped neck portion 606 which turns outwardly to form a generally conical-shaped portion 608 which turns substantially perpendicularly to form a generally annular-shaped portion 610. A bottom reflecting surface 612 is contiguously formed with portion 610 and is positioned transversely relative thereto.

Neck portion 606 is received within an opening 414 formed through a bottom side 412 of lower cover 410 such that reflector 600 is surrounded by body 502 of shade member 500. Reflector 600 focuses the light emitted from the light emitting diodes disposed on MCPCP and LED assembly 406 such that the light emitted from lantern 10 from the light emitting diodes has a far beam throw.

Referring to FIGS. 1 and 6, lantern 10 further comprises a base 700 having a generally annular-shaped body 702 which terminates at an open-ended top side 704 and at an oppositely situated open-ended bottom side 706. Body 702 has an exterior wall 708 oppositely situated to an interior wall 710, wherein interior wall 710 surrounds an opening 712, wherein opening 712 is in fluid communication with open-ended top and bottom sides 704 and 706. Interior wall 710 comprises a threaded portion 714, wherein base 700 is attached to shade member 500 through the engagement of threaded portion 714 of base 700 with threaded foot 510 of shade member 500. Exterior wall 708 has a series of grooves 716 formed thereon, wherein the grooves from series 716 are formed at regular intervals on and around exterior wall 708. In an exemplary embodiment, body 702 comprises a photoluminescent material such that base 700 glows in the dark.

Figure 7:
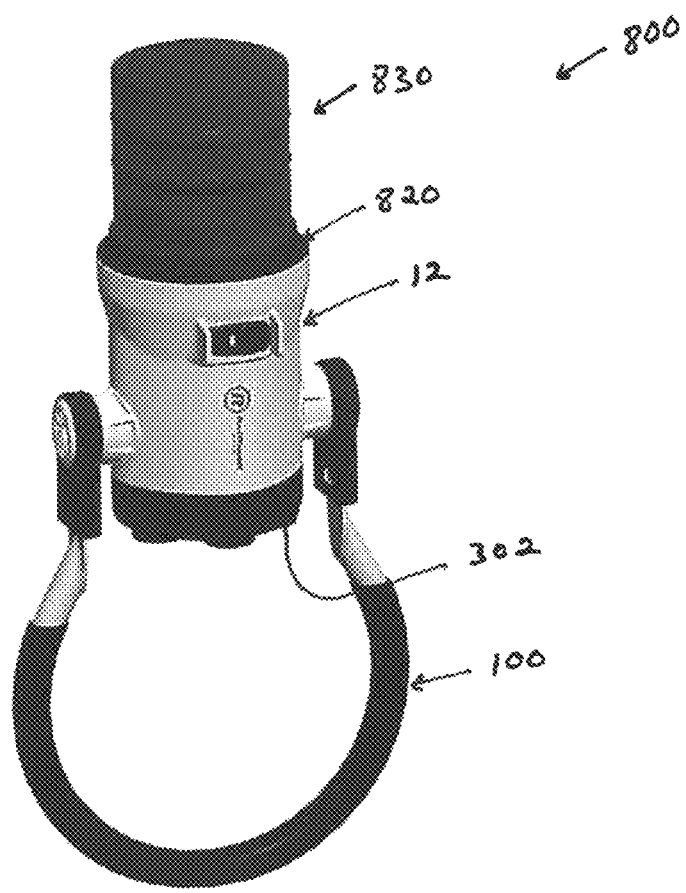
FIG. 7 is a schematic depicting a bottom perspective view of an exemplary lantern.
Figure 8:
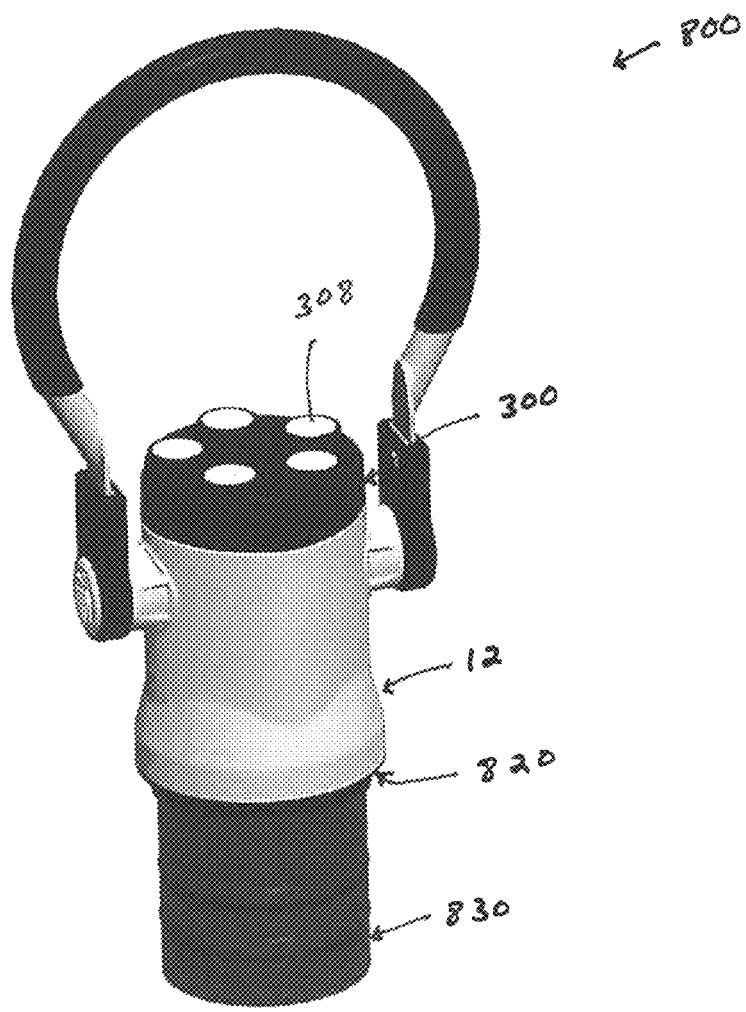
FIG. 8 is a schematic depicting a top perspective view of the lantern depicted in FIG. 7.

Another exemplary lantern is depicted in FIGS. 7-9. Referring to FIGS. 7-9, a lantern 800 includes many of the same components as lantern 10, wherein such like components shall be referred to with identical reference numbers. Lantern 800 comprises main body housing 12 and handle 100 and has the breakaway assembly and the handle repositioning assembly as described above-herein with reference to lantern 10. Lantern 800 comprises a light emitting unit 810 that is powered by batteries that are housed in battery housing 200. Lantern 800 further comprises end cap 300 which engages with threaded lip portion 16 of main body housing 12 to thereby contain battery housing 200 between main body housing 12 and end cap 300. Magnets 308 are positioned within and secured to each of the indents of plurality 306 formed on top side 302 of end cap 300.

Lantern 800 further comprises a signal receiver member 820 comprising a side wall 824 having an upper threaded portion 823 and a lower threaded portion 825. Side wall 824, which surrounds a chamber 826, is disposed between an open-ended top side 822 and an oppositely situated open-ended bottom side 827. Signal receiver member 820 is secured to main body housing 12 by engaging upper threaded portion 823 with a threaded portion 829 of main body housing 12, wherein threaded portion 829 of main body housing 12 is oriented towards bottom side 18 of main body housing 12.

Lantern 800 further comprises a signal member 830 having a side wall 832 which is disposed between an open-ended top side 834 and a bottom side 836 of signal member 830. An interior wall of side wall 832 comprises a threaded portion 838 which engages with lower threaded portion 825 of signal receiving member 820 to thereby secure signal member 830 to main body housing 12.

Side wall 832 of signal member 830 is preferably colored such that when light emitting unit 810 generates and transmits light from lantern 800, the light emitted from side wall 832 serves to signal a message understood by those in the visible vicinity of lantern 800. In an exemplary embodiment, side wall 832 has a blue color so that side wall 832 shines blue when light from light emitting unit 810 is transmitted by light emitting unit 810. In this way, lantern 800 is particularly useful as a safety device in the railway industry. New technology has made locomotives much quieter which has raised safety concerns, particularly in the switching yard where some yards have up to about 25 lined-up tracks. The added safety feature of a colored light, particularly a blue colored light, wherein the color blue has significance as a warning or alert color in the railroad industry.

While the disclosure has been shown and described with reference to certain preferred embodiments thereof, it will be understood by those skilled in the art that various changes in form and detail may be made therein without departing from the spirit and scope of the disclosure. It is further realized that although the lantern disclosed herein has been described as particularly beneficial for use as a trainman's lantern, the lantern is not to be limited to such a use.

What is claimed is:

1. A lantern comprising:
    a handle comprising a body having an underside oppositely situated to an upper side, and further wherein the body terminates at a first terminal end thereof and at an oppositely situated second terminal end thereof;
    a first extension and a second extension, wherein each of the first and the second extensions comprises a plate having a first terminal end oppositely situated to a second terminal end wherein the first terminal end of the first extension is physically attached to the first terminal end of the handle and the first terminal end of the second extension is physically attached to the second terminal end of the handle;
    a main body housing comprising a side wall having an exterior side and an interior side, wherein the side wall terminates at an anterior directed end and at an oppositely situated posterior directed end wherein the anterior directed end is oriented towards the underside of the handle, and wherein the main body housing further comprises a chamber surrounded by the interior side wherein the chamber holds a light emitting unit, wherein when a threshold force is exerted against the underside of the handle, the handle is disengaged from the main body housing;
    a first mount and a second mount, wherein each of the first and the second mounts comprises a body that extends from the exterior side of the side wall of the main body housing;
    a first receiver member and a second receiver member, wherein each of the first and the second receiver members comprises a body having an opening formed therethrough and being defined at an upper end thereof by an open-ended upper wall and being defined at a lower end thereof by a lower wall, wherein the body of the first mount is received within the opening of the body of the first receiver member and the body of the second mount is received within the opening of the body of the second receiver member, and further wherein the second terminal end of the first extension member is received within the open-ended upper wall of the body of the first receiver member and the second terminal end of the second extension member is received within the open-ended upper wall of the body of the second receiver member; and
    a signal member having an open-ended top side oppositely situated to a bottom side, and a side wall disposed between the open-ended top side and the bottom side of the signal member, wherein the open-ended top side of the signal member is joined to the posterior directed end of the main body housing.

2. The lantern of claim 1, wherein the side wall of the signal member comprises a blue color.

3. The lantern of claim 1, further comprising a signal receiving member having a side wall having an open-ended top side oppositely situated to an open-ended bottom side, and an exterior directed side oppositely situated to an interior directed side, wherein the interior-directed side surrounds a chamber, and wherein the open-ended bottom side of the signal receiving member receives and holds the open-ended top side of the signal member, and the posterior directed end of the main body housing receives and holds the open-ended top side of the signal receiving member.

4. The lantern of claim 3, wherein each of the plates of the first and the second extensions has an engagement member formed therein, and wherein the lantern further comprises a first clip and a second clip, wherein each of the first and the second clips comprises a plate having an extension engaging member formed thereon and a receiver engaging member formed thereon, wherein the extension engaging member of the first clip is engaged with the engagement member of the first extension and the extension engaging member of the second clip is engaged with the engagement member of the second extension, and the receiver engaging member of the first clip is received within the open-ended upper wall of the first receiver, and the receiver engaging member of the second clip is received within the open-ended upper wall of the second receiver to thereby secure the handle to the main body housing, and further wherein when a threshold force is exerted against the underside of the handle, the first and the second clips disengage from the respective first and second receivers to thereby remove the handle from the main body housing.

5. The lantern of claim 3, further comprising an end cap having a top side oppositely situated to a bottom side, wherein the bottom side of the end cap is engaged with the anterior directed end of the main body housing, and further wherein the top side of the end cap comprises an indentation formed therein, and wherein the lantern further comprises a magnet wherein the magnet is disposed within the indentation.

6. The lantern of claim 3, wherein the posterior directed end of the main body housing has a threaded member, and the open-ended top side of the signal receiving member has a first complementary threaded member, wherein the threaded member of the main body housing and the first complementary threaded member of the signal receiving member engage with one another to thereby hold the signal receiving member to the main body housing.

7. The lantern of claim 6, wherein the open-ended top side of the signal member has a threaded member, and the open-ended bottom side of the signal receiving member has a second complementary threaded member, wherein the threaded member of the signal member and the second complementary threaded member of the signal receiving member engage with one another to thereby hold the signal member to the signal receiving member.

8. The lantern of claim 7, wherein the side wall of the signal member comprises a blue color.

9. The lantern of claim 8, further comprising an end cap having a top side oppositely situated to a bottom side, wherein the bottom side of the end cap is engaged with the anterior directed end of the main body housing, and further wherein the top side of the end cap comprises an indentation formed therein, and wherein the lantern further comprises a magnet wherein the magnet is disposed within the indentation.

10. The lantern of claim 3, wherein each of the bodies of the first and the second mounts has an open-ended exterior directed face positionally opposed to the main body housing which leads into an opening, and further wherein each of the first and the second mounts further comprises a protrusion positioned within the opening of the bodies of the respective first and the second mounts; and wherein the lantern further comprises:
- a first positioning member and a second positioning member, wherein each of the first and the second positioning members comprises a body having an open-ended interior directed side which leads into a cavity, and an exterior directed side oppositely positioned from the open-ended interior directed side and which has a stop member formed thereon; and further wherein:
  - a recess is formed on each of the inwardly directed faces of the first receiver member and the second receiver member;
  - a catch member is formed within the recesses of each of the first and the second receiver members;
wherein the protrusion of the first mount is received within the cavity of the first positioning member via the open-ended interior directed side, the stop member of the first positioning member is engaged with the catch member of the first receiver member, the protrusion of the second mount is received within the cavity of the second positioning member via the open-ended interior directed side, and the stop member of the second positioning member is engaged with the catch member of the second receiver member to thereby allow for the pivoting motion of the body of the handle relative to the main body housing.

11. The lantern of claim 10, further comprising a first spring and a second spring, wherein the first spring is disposed over the first protrusion and contained within the cavity of the first positioning member and the second spring is disposed over the second protrusion and contained within the cavity of the second positioning member such that the pivoting motion of the handle occurs via a spring mechanism created by an interaction between the first spring, the first positioning member, and the first receiving member and an interaction between the second spring, the second positioning member, and the second receiving member.

12. The lantern of claim 11, wherein the stop members of each of the first and the second positioning members comprises a plurality of radially disposed bumpers, and wherein the catch members of each of the first and the second receiving members comprises a plurality of radially disposed grooves, wherein the plurality of radially disposed grooves of the first receiving member interconnect with the plurality of radially disposed bumpers of the first positioning member, and the plurality of radially disposed grooves of the second receiving member interconnect with the plurality of radially disposed bumpers of the second positioning member to thereby control the pivoting motion of the handle.

* * * * *